(12) United States Patent
Kondo et al.

(10) Patent No.: US 7,800,624 B2
(45) Date of Patent: *Sep. 21, 2010

(54) MEMORY DEVICE SIGNAL PROCESSING APPARATUS IMAGE SIGNAL PROCESSING APPARATUS AND METHODS OF THE SAME

(75) Inventors: Tetsujiro Kondo, Tokyo (JP); Kazushi Yoshikawa, Kanagawa (JP); Junichi Ishibashi, Saitama (JP); Seiji Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 128 days.

This patent is subject to a terminal disclaimer.

(21) Appl. No.: 10/490,208

(22) PCT Filed: Jul. 30, 2003

(86) PCT No.: PCT/JP03/09637

§ 371 (c)(1),
(2), (4) Date: Mar. 29, 2004

(87) PCT Pub. No.: WO2004/012450

PCT Pub. Date: Feb. 5, 2004

(65) Prior Publication Data

US 2004/0252125 A1 Dec. 16, 2004

(30) Foreign Application Priority Data

Jul. 30, 2002 (JP) ............................ 2002-222008

(51) Int. Cl.
*G06F 12/02* (2006.01)
*G06F 12/00* (2006.01)
*G06K 9/46* (2006.01)
(52) U.S. Cl. .................. 345/565; 345/564; 382/236
(58) Field of Classification Search .............. 345/530, 345/564, 565; 382/238, 239, 236
See application file for complete search history.

(56) References Cited

U.S. PATENT DOCUMENTS 4,307,420 A * 12/1981 Ninomiya et al. ...... 375/240.14

(Continued)

FOREIGN PATENT DOCUMENTS

EP 0 420 657 A2 4/1991

(Continued)

OTHER PUBLICATIONS

"Adaptive DPCM", http://www.cmlab.csie.ntu.edu.tw/cml/dsp/training/coding/dpcm/dp3.htm.*

(Continued)

*Primary Examiner*—Joni Hsu
(74) *Attorney, Agent, or Firm*—Oblon, Spivak, McClelland, Maier & Neustadt, L.L.P.

(57) ABSTRACT

A memory device, a signal processing apparatus, and an image signal processing apparatus and signal processing methods configured to perform matching processing with a small amount of calculation and accurately detecting motion vectors, provided with a memory for converting by using a feature including a pixel value in a certain block range having a focused pixel at its center as an address based on information of a reference frame stored in a second frame memory; and a matching portion for reading storage information of the ME memory by using a feature of a focused pixel included in information of a current frame supplied from a first frame memory as a feature address, calculating a distance between the focused pixel in the current frame and a feature address (position coordinates) read from the ME memory, and detecting differential coordinates based on position information having the minimum distance from a plurality of candidates as motion vectors of the focused pixel.

29 Claims, 15 Drawing Sheets

U.S. PATENT DOCUMENTS

| | | | |
|---|---|---|---|
| 4,703,352 A | | 10/1987 | Kondo |
| 4,710,811 A | | 12/1987 | Kondo |
| 4,754,490 A | * | 6/1988 | Swonger ..................... 382/170 |
| 5,475,431 A | * | 12/1995 | Tsukagoshi ............ 375/240.13 |
| 5,673,339 A | * | 9/1997 | Lee ............................ 382/236 |
| 5,692,063 A | * | 11/1997 | Lee et al. .................... 382/107 |
| 5,717,615 A | | 2/1998 | Pirson et al. |
| 5,768,430 A | * | 6/1998 | Takashima et al. .......... 382/236 |
| 5,809,173 A | * | 9/1998 | Liu et al. .................... 382/233 |
| 5,940,539 A | * | 8/1999 | Kondo et al. ................ 382/236 |
| 6,259,734 B1 | * | 7/2001 | Boon ......................... 375/240 |
| 6,661,842 B1 | * | 12/2003 | Abousleman .......... 375/240.11 |

FOREIGN PATENT DOCUMENTS

| | | |
|---|---|---|
| EP | 0 601 878 A1 | 6/1994 |
| EP | 0 664 653 A2 | 7/1995 |
| JP | 61-107886 | 5/1986 |
| JP | 7-59093 | 3/1995 |
| JP | 7-087494 | 3/1995 |
| JP | 7-87499 | 3/1995 |
| JP | 10-191344 | 7/1998 |
| JP | 2000-197061 | 7/2000 |
| JP | 2003-296728 | 10/2003 |
| WO | WO 01/01692 A1 | 1/2001 |

OTHER PUBLICATIONS

M. M. L. Lai, et al., "Coding of Image Sequences using Coarse Quantization and Feature Based Hierarchical Block Matching", Image Processing and its Applications, XP-006500245, 1992, pp. 586-589.

* cited by examiner

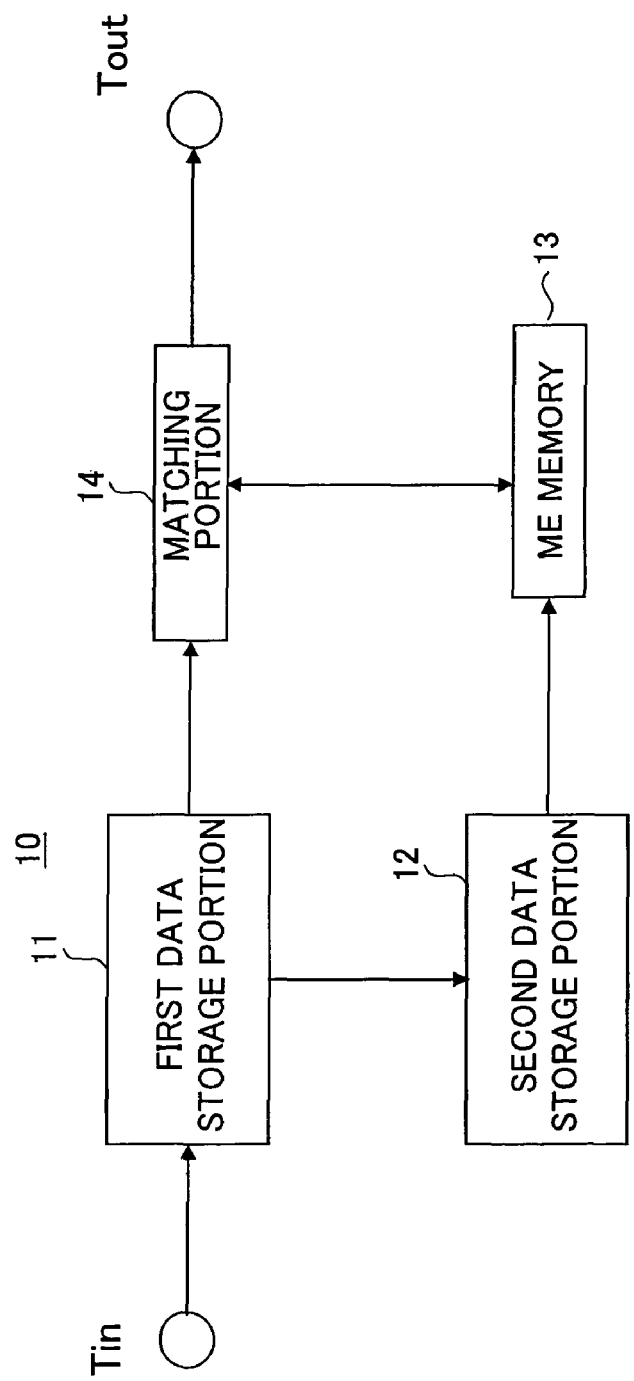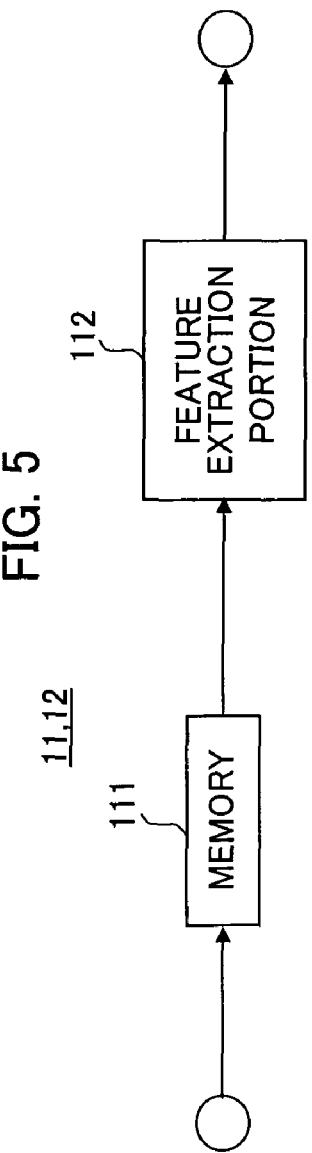

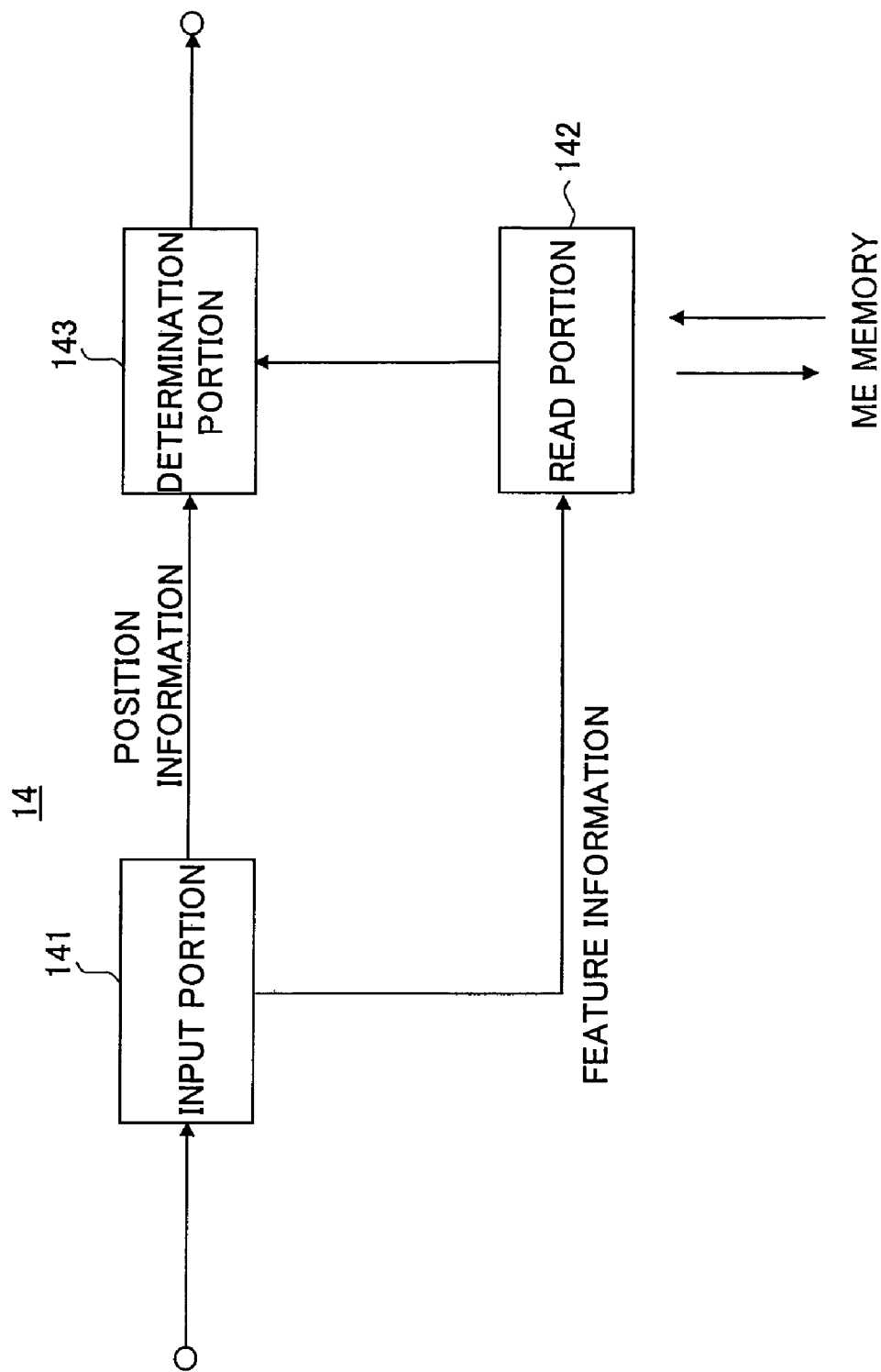

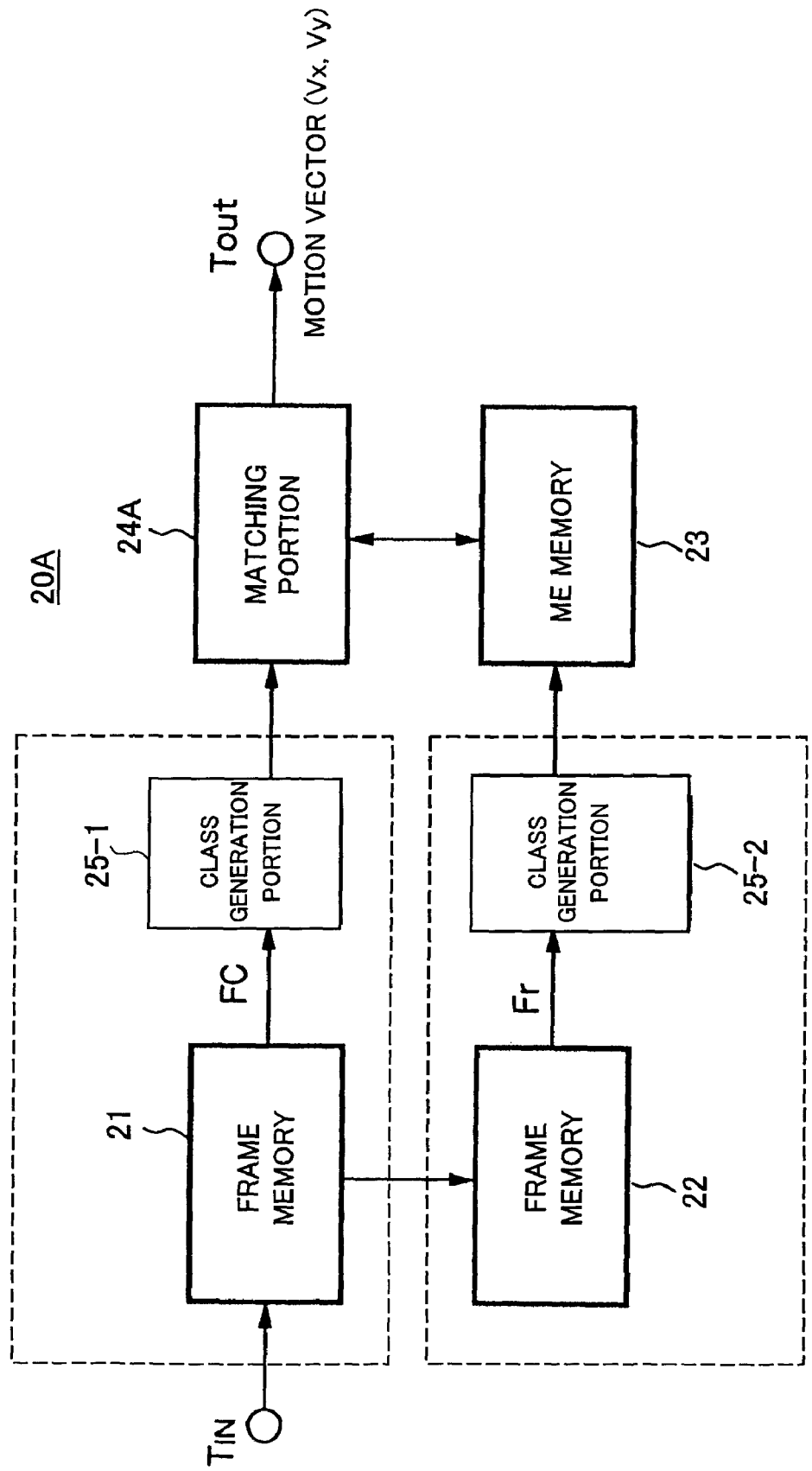

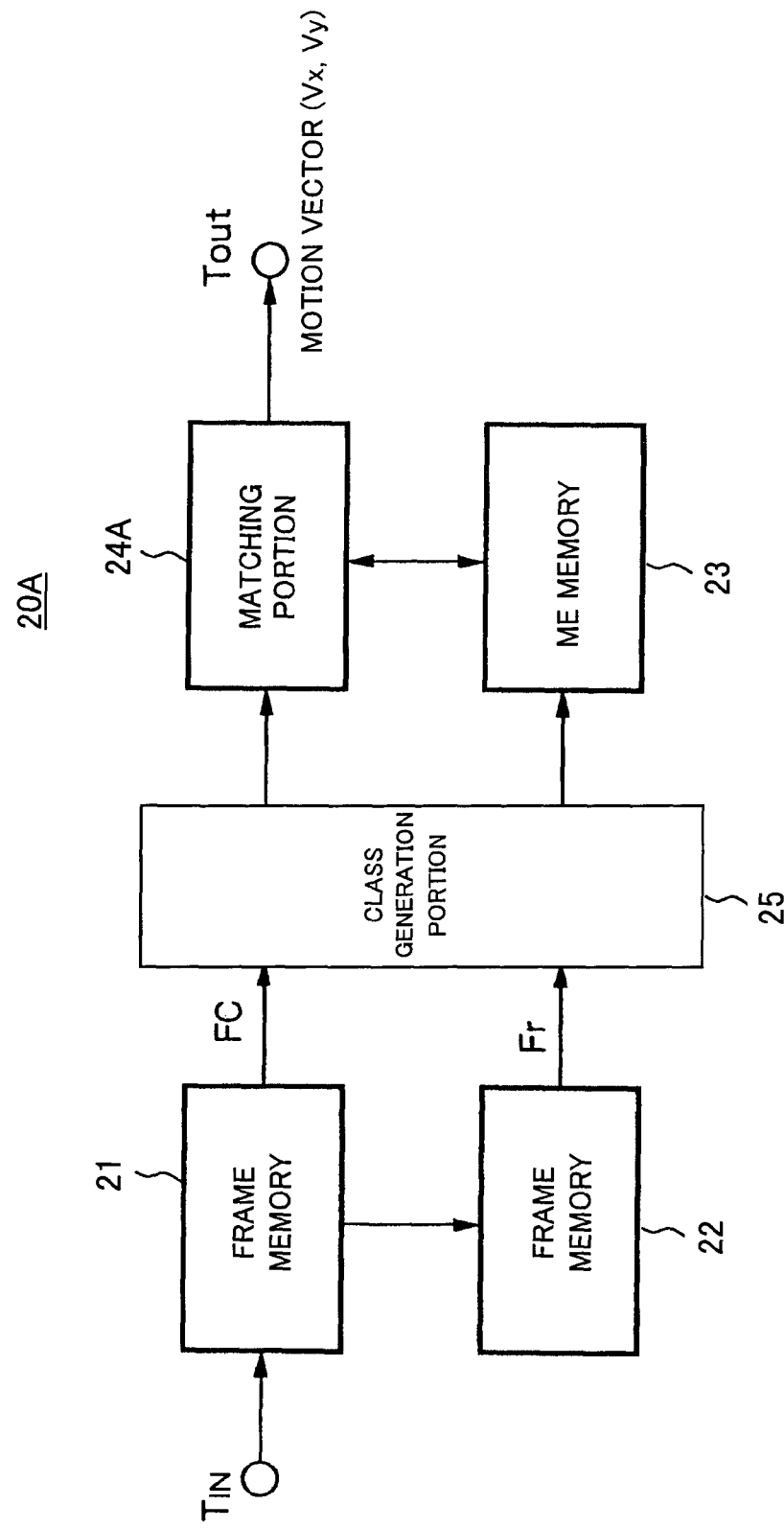

ONE LINE IN CURRENT FRAME

ONE LINE IN REFERENCE FRAME

| ADRC CODE | 0 | 1 | 1 | 0 | 1 | | 0 | 1 | 1 | 0 | 1 |
|---|---|---|---|---|---|---|---|---|---|---|---|
| 1-BIT MASK | 140 | 142 | 142 | 140 | 142 | = | 140 | 142 | 142 | 140 | 142 |
| 2-BIT MASK | 140 | 140 | 140 | 140 | 140 | ≠ | 138 | 140 | 140 | 140 | 140 |
|  |  |  |  |  |  | ≠ | 136 | 140 | 140 | 140 | 140 |

136 [DECIMAL NUMBER] = 10001000 [BINARY NUMBER]
138 [DECIMAL NUMBER] = 10001010 [BINARY NUMBER]    139 [DECIMAL NUMBER] = 10001011 [BINARY NUMBER]
140 [DECIMAL NUMBER] = 10001100 [BINARY NUMBER]    141 [DECIMAL NUMBER] = 10001101 [BINARY NUMBER]
142 [DECIMAL NUMBER] = 10001110 [BINARY NUMBER]    143 [DECIMAL NUMBER] = 10001111 [BINARY NUMBER]

FIG. 16

| DECIMAL NUMBER EXPRESSION | HEXADECIMAL NUMBER EXPRESSION |
|---|---|
| 136 | 0x10001000 |
| 137 | 0x10001001 |
| 138 | 0x10001010 |
| 139 | 0x10001011 |
| 140 | 0x10001100 |
| 141 | 0x10001101 |
| 142 | 0x10001110 |
| 143 | 0x10001111 |

MEMORY DEVICE SIGNAL PROCESSING APPARATUS IMAGE SIGNAL PROCESSING APPARATUS AND METHODS OF THE SAME

TECHNICAL FIELD

The present invention relates to a memory device, a signal processing apparatus, an image signal processing apparatus and signal processing methods applicable to processing requiring matching, such as a motion detection device and an object search device, etc. used, for example, in a motion image compression apparatus, etc.

BACKGROUND ART

A matching processing of a signal, particularly, a matching processing of an image signal has a problem of generally causing a large amount of calculation. A motion vector detection by block matching as described below is an example of using the matching processing.

Namely, in an image signal processing apparatus, motion detection for obtaining a motion vector indicating a motion of an image is one major technique for effectively performing the motion image compression. There are some proposed methods of obtaining the motion vector, but one major method is a method called block a matching algorithm.

FIG. 1 is a block diagram showing an example of a configuration of a motion detection device in an image signal processing apparatus of the related art, wherein the block matching algorithm is applied.

The motion detection device 1 comprises frame memories 2 and 3 and a motion vector detection portion 4.

In the motion detection device 1, when an image signal is input from an input terminal TIN, an information of one frame is stored in the frame memory 2.

When an information of the next image is input, the previous (previously input) information in the frame memory 2 is stored in the frame memory 3, and the currently (this time) input information is stored in the frame memory 2.

Namely, an information of a current frame Fc is stored in the frame memory 2, and an information of a reference frame Fr is stored in the frame memory 3.

Next, the information of the current frame Fc and the reference frame Fr is sent to the vector detection portion 4 and divided to blocks in the motion vector detection portion 4 where a motion vector (Vx, Vy) is detected and output from a terminal TOUT.

FIG. 2 is a view for explaining an outline of block matching algorithm. Below, the outline of algorithm will be explained with reference to FIG. 2.

In this algorithm, a motion vector of a focused pixel Fc (x, y) in the current frame Fc is obtained by calculating a differential absolute value sum of corresponding pixels in pixels in a reference block range (L×L) having the focused pixel Fc (x, y) at its center and pixels in the same block range as the above block range (L×L) in a search area SR in the reference frame Fr.

The above calculation is repeated while moving the block range extracted in the search area SR by one pixel, and a differential vector of the center position of a block having the smallest differential absolute value sum in all blocks and the focused pixel position is regarded as the solution (motion vector).

Next, a processing procedure of detecting a motion vector of the pixel Fc (x, y) in the current frame Fc will be explained in detail with reference to FIG. 3.

Step ST1:
In the step ST1, a search area SR using as a reference the same position in the reference frame as the position (x, y) of the focused pixel is determined after starting processing ST0.

Step ST2:
In the step ST2, the maximum value of a calculation formula is substituted to initialize a variable "min" storing the minimum value of a calculation result. When assuming that one pixel is 8 bits and the number of pixels in a block is 16, $2^8 \times 16 = 4096$ is assigned to the variable "min".

Step ST3:
In the step ST3, a counter variable "n" for counting blocks in a search area SR is initialized to be "1"

Step ST4:
In the step ST4, a variable "sum" for being substituted a calculation result is initialized to be "0".

Step ST5:
In the step ST5, assuming that a range of a reference block is L×L, a pixel in a certain block in the current frame is Fc (i, j), and a pixel in the k-th block in the search area SR of the reference frame Fr is Frk (i, j), calculation of a differential absolute value sum of corresponding pixels, that is, the formula 1 below is performed and the calculation result is substituted for "sum".

$$\sum_{i=1}^{L} \sum_{j=1}^{L} = |Fc(i, j) - Frk(i, j)| \qquad (1)$$

Step ST6
In the step ST6, the relationship of large and small is distinguished between the calculated differential absolute value sum "sum" and the minimum value "min" of the differential absolute value sum. When the calculated differential absolute value sum "sum" is smaller, the procedure proceeds to a step ST7, while when it is larger (including being equal), the calculation result is not the minimum value, so that the step ST7 is skipped and the procedure proceeds to a step ST8.

Step ST7:
In the step ST7, the calculation result "sum" is updated by the minimum value "min", and a counter value "n" of the block as a motion vector number is set.

Step ST8:
In the step ST8, if the block counter value "n" is the total number of blocks in the search area SR, that is, the final block comes, it means the finish, so the procedure proceeds to a step ST10, while if it is not the final block, the procedure proceeds to a step ST9.

Step ST9:
In the step ST9, the block counter value "n" is incremented to "n+1", and the procedure proceeds to the step ST4 to repeat the calculation.

Step ST10:
In the step ST10, a motion vector is obtained from the center pixel and (x, y) of a block having a number stored in a motion number and output the same.

Since the block matching algorithm explained above repeats the calculation of the formula (1), there is a disadvantage that an amount of the calculation becomes enormous and most of the time of image compression processing, such as MPEG, is spent for that.

DISCLOSURE OF THE INVENTION

An object of the present invention is to provide a memory device, a signal processing apparatus, an image processing apparatus and signal processing methods capable of performing matching processing, etc. only with a small amount of calculation and accurately detecting a motion vector, etc.

To attain the above object, a first aspect of the present invention is a memory device for storing information, characterized by comprising an input/output means for receiving or outputting the information; and a storage portion for storing the information; wherein the storage portion is at least controlled by an address corresponding to a feature of a focused data in a predetermined signal; and the information is a position information of the focused data in the predetermined signal.

Preferably, the memory device is a semiconductor device.

A second aspect of the present invention is a signal processing apparatus for performing matching processing by using a first signal including a plurality of first data and a second signal including a plurality of second data, characterized by comprising a first feature extraction means for extracting a feature as focused data being data at a focused position in the first signal; and a storage means for storing position information of the second data at a position specified by an address corresponding to the feature of each of the second data; wherein the position information of the second data corresponding to the focused data is obtained by reading the position information to the second data stored in the storage means at an address corresponding to the feature of the focused data.

Preferably, the storage means stores the position information of the second data in advance.

Also, the above signal processing apparatus further comprises a second feature extraction means for extracting a feature of each of second data in the second signal.

Preferably, the first feature extraction means further comprises a second feature extraction means for extracting a feature of each of second data in the second signal.

Also, the first or second signal is an image signal.

Also, the feature is extracted by using a predetermined number of first or second data.

Also, the feature is a distribution of values of a predetermined number of first or second data.

Also, the first or second data is expressed by a plurality of bits, and the feature is a distribution of values of the predetermined number of first or second data wherein predetermined bits are omitted from the plurality of bits.

Preferably, the predetermined bits are lower side bits of the first or second data.

Also, the feature is a distribution of values of predetermined number of re-quantized first or second data. A feature is a distribution of values of predetermined number of first or second data subjected to adaptive quantization. Also, the adaptive quantization is an ADRC.

Preferably, when a plurality of position information of the second data corresponding to a feature of the focused data are read from the storage means, the position information having the shortest distance to a position of the focused data is regarded as position information of the second data corresponding to the focused data.

A third aspect of the present invention is an image signal processing device for detecting motion vectors by using a first image signal including a plurality of first data and a second image signal including a plurality of second data, characterized by comprising a first feature extraction means for extracting a feature as focused data being data at a focused position in the first image signal; a storage means for storing position information of the second data at a position specified by an address corresponding to the feature of each of the second data; and a motion vector calculation means for obtaining position information of the second data corresponding to the focused data by reading position information of the second data stored in the storage means at an address corresponding to the feature of the focused data and calculating a motion vector of the focused data by using position information of the focused data and the obtained position information of the second data.

Preferably, when a plurality of position information of the second data corresponding to a feature of the focused data are read from the storage means, the motion vector calculation means regards the position information having the shortest distance to a position of the focused data as position information of the second data corresponding to the focused data.

A fourth aspect of the present invention is a signal processing method for performing matching processing by using a first signal including a plurality of data and a second signal including a plurality of second data, comprising a first step for extracting a feature as focused data being data at a focused position in the first signal; a second step for storing position information of the second data at a position specified by an address corresponding to the feature of each of the second data; and a third step for obtaining position information of the second data corresponding to the focused data by reading position information to the second data stored in the second step at an address corresponding to the feature of the focused data.

A fifth aspect of the present invention is an image signal processing method for detecting a motion vector by using a first image signal including a plurality of first data and a second image signal including a plurality of second data, comprising a first step for extracting a feature as a focused data being data of a focused position in the first images signal; a second step for storing position information of the second data at a position specified by an address corresponding to the feature of each of the second data; a third step for obtaining position information of the second data corresponding to the focused data by reading position information to the second data stored in the storage means at an address corresponding to the feature of the focused data; and a fourth step for calculating a motion vector of the focused data by using position information of the focused data and the obtained position information of the second data.

BRIEF DESCRIPTION OF DRAWINGS

FIG. 4 is a block diagram showing a signal processing apparatus having a basic configuration of a motion detection device as a principal part of an image signal processing apparatus according to the present invention.

FIG. 5 is a block diagram showing an example of a basic configuration of first and second data storing portions in FIG. 4.

FIG. 6 is a block diagram showing an example of a configuration of a matching portion in FIG. 4.

FIG. 12 is a block diagram showing a second embodiment of a motion detection device according to the present invention.

FIG. 13 is a block diagram showing another example of a configuration of a motion detection device according to the second embodiment.

FIG. 16 is a view showing a correspondence relationship of decimal number and hexadecimal number of a luminance value.

BEST MODE FOR CARRYING OUT THE INVENTION

Figure 1:
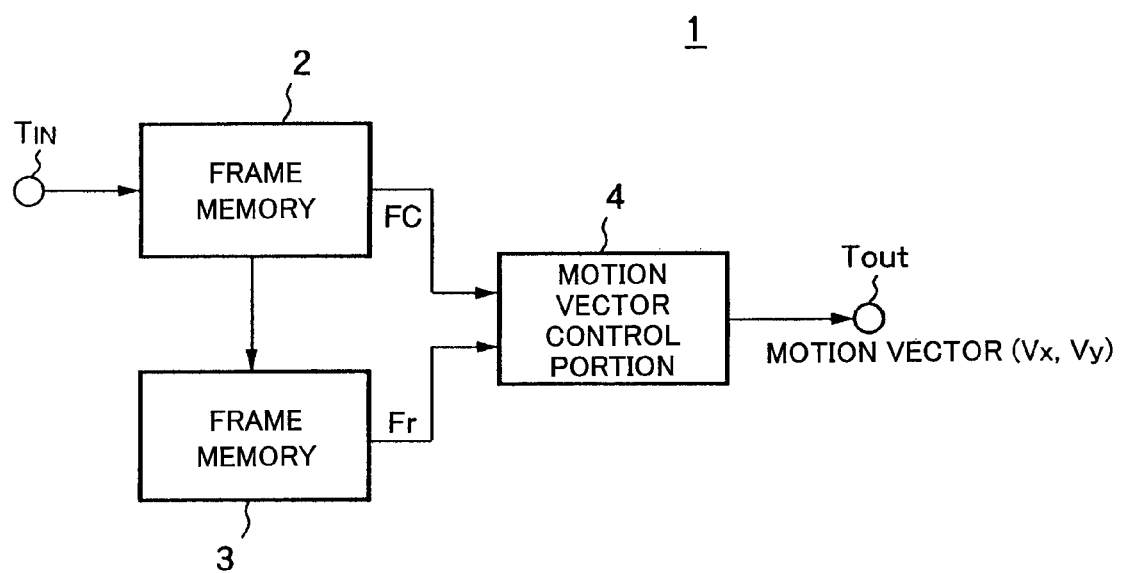
FIG. 1 is a block diagram showing an example of a configuration of a motion detection device of the related art wherein block matching algorithm is applied.
Figure 2:
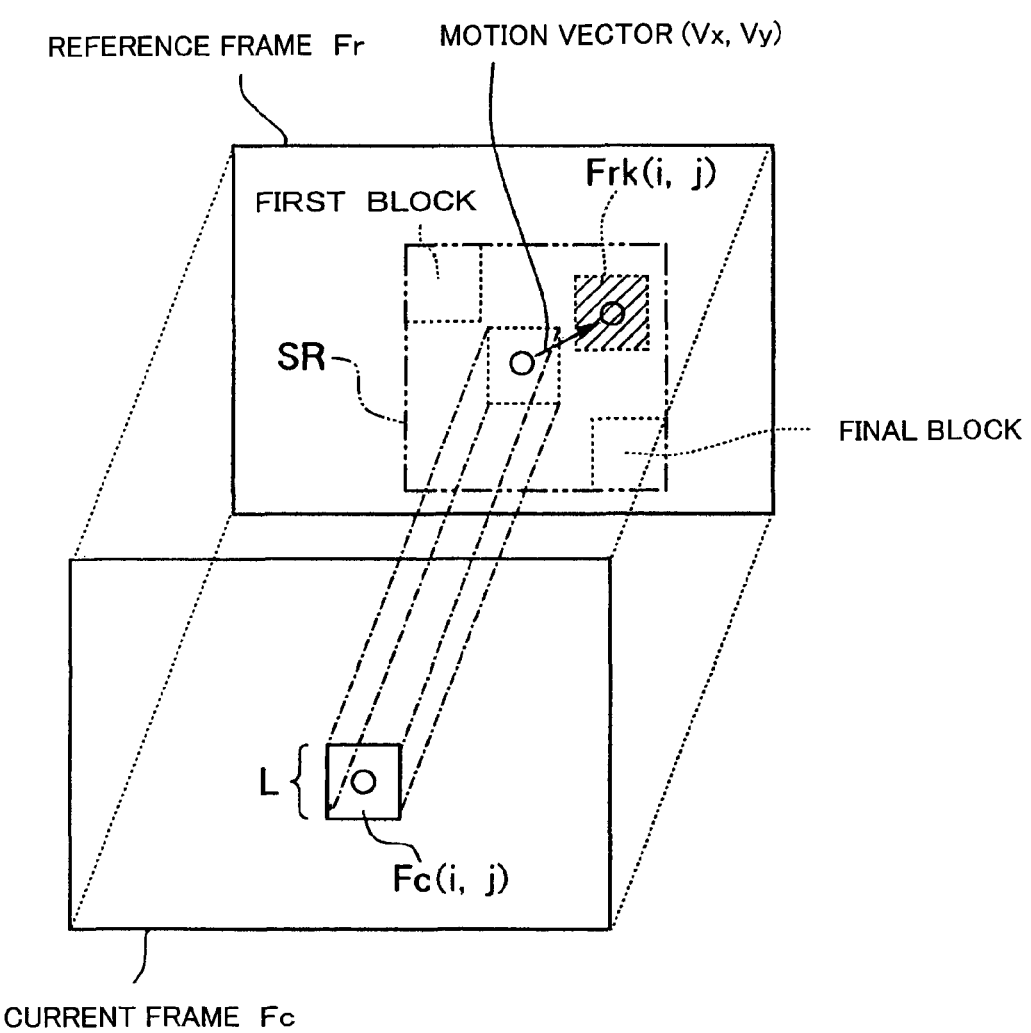
FIG. 2 is a view for explaining an outline of block matching algorithm.
Figure 3:
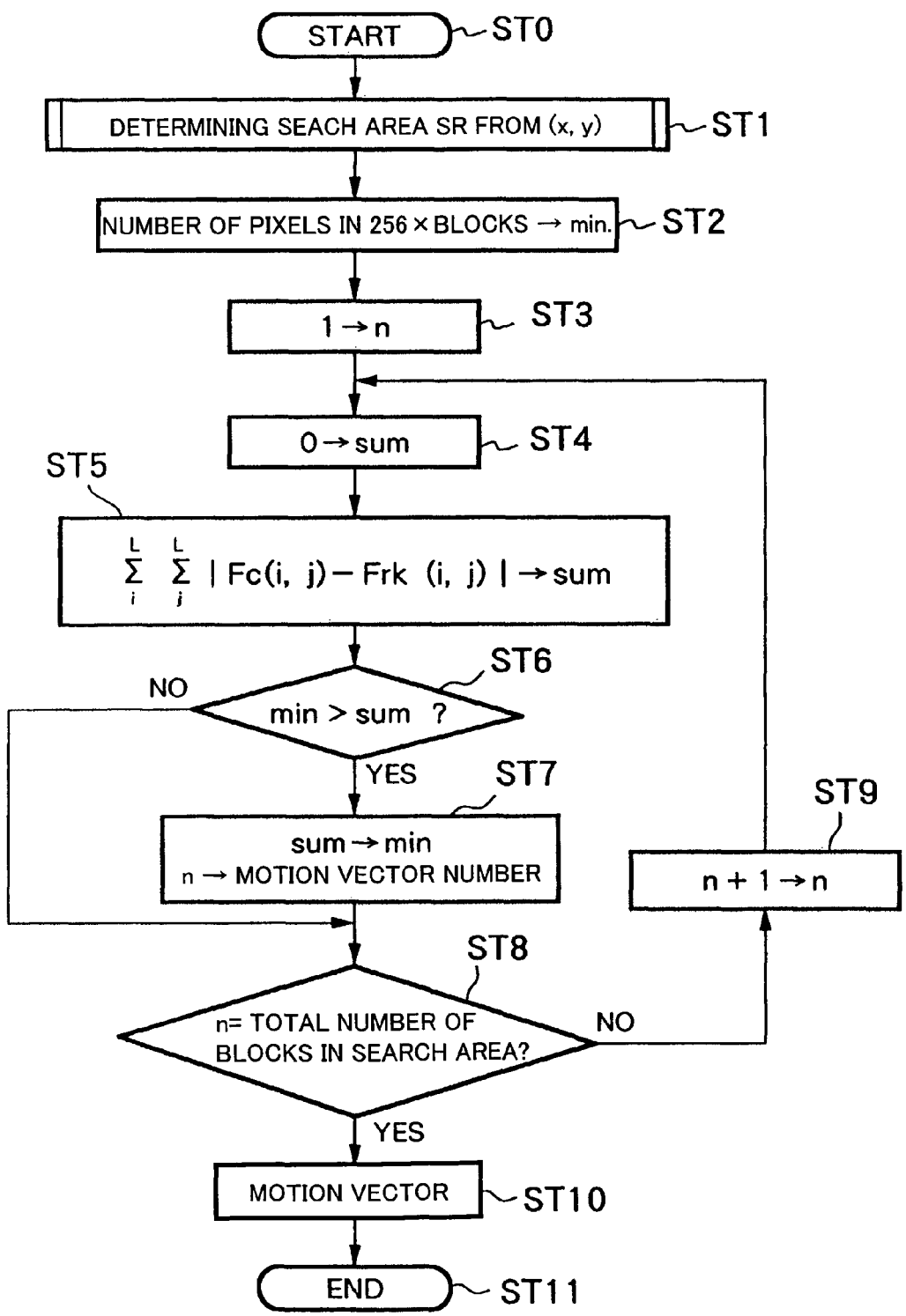
FIG. 3 is a flowchart for explaining a processing procedure of detecting a motion vector of a pixel Fc (x, y) in a current frame FC.

Below, preferred embodiments of the present invention will be explained with reference to the attached drawings.

FIG. 4 is a block diagram showing a signal processing device having a basic configuration of a motion detection device as a principal part of an image signal processing apparatus according to the present invention.

The signal processing apparatus is for accurately estimating position information (a motion vector) with a small amount of calculation by performing processing of obtaining (determining) position information of second data corresponding to focused data by reading the position information of second data included in a second signal stored in a motion detection memory (hereinafter, referred to as an ME memory) at an address corresponding to a feature of the focused data being data at a focused position in a first signal including a plurality of first data.

Note that the ME memory (a feature address, i) indicates data stored at a position specified by an address (a feature address, i) in the ME memory.

Below, the specific configuration and function of the signal processing apparatus will be explained in detail with reference to the drawings.

The signal processing apparatus 10 comprises a first data storing portion 11, a second data storing portion 12, an ME memory 13 and a matching portion 14.

Note that the first data storing portion 11 configures a first feature extraction means according to the present invention, the second data storing portion 12 configures a second feature extraction means according to the present invention, the ME memory 13 configures a storage means according to the present invention, and the matching portion 14 configures a motion vector calculation means (matching means) according to the present invention.

The first data storing portion 11 stores a first signal including a plurality of first data input from an input terminal TIN.

The first data storing portion 11 receives as an input the next first signal and stores this next first signal and outputs the previously stored first signal as a second signal including a plurality of second data to the second data storing portion 12 and the matching portion 14.

Also, the first data storing portion 11 extracts a feature of a focused data being data at a focused position from the stored first signal and supplies feature information including position information of the focused data to the matching portion 14.

The second data storing portion 12 stores the previous (for example, one time before) second signal stored in the first data storing portion 11, extracts a feature of each of the second data from the stored second signal and stores in the ME memory 13.

FIG. 5 is a block diagram showing an example of a configuration of the first and second data storing portions. As shown in FIG. 5, the first and second data storing portions respectively comprises a memory 111 and a feature extraction portion 112 for extracting a feature from the first or second signal stored in the memory 111.

The ME memory 13 receives features of second data of the second signal in the second data storing portion 12 and stores position information of the second data at positions specified by addresses corresponding to the features of the second data.

The matching portion 14 obtains (determines) position information of second data corresponding to the focused data by reading the position information of the second data included in the second signal stored in the ME memory 13 at an address corresponding to a feature of the focused data being data at a focused position input from the first data storing portion 11.

When a plurality of position information of the second data corresponding to a feature of the focused data is read from the ME memory 13, the matching portion 14 regards the above position information closest to a position of the focused data as position information of second data corresponding to the focused data.

FIG. 6 is a block diagram showing an example of a configuration of a matching portion 14.

The matching portion 14 comprises, as shown in FIG. 6, an input portion 141, a read portion 142 for reading the position information of the second data included in the second signal stored in the ME memory 13 at an address corresponding to a feature of the focused data being data of a focused position based on feature information from the input portion 141, and a determination portion 143 for determining position information of the second data corresponding to the focused data based on the position information of the first data from the input portion 141 and the information read from the ME memory 13. When used in motion detection, the determination portion 413 determines as a motion vector and output the same.

Note that the first and second signals are, for example, image signals.

Also, for example, feature extraction in the first and second data storing portions 11 and 12 is performed by using predetermined number of first and second data. Also, the feature is a distribution of values of the predetermined number of first or second data. Alternately, the first and second data is expressed by a plurality of bits, and the feature is a distribution of values of the above predetermined number of first or second data excluding predetermined bits from the above plurality of bits. Here, the predetermined bits are lower side bits of the first or second data. Also, the feature is a distribution of values of predetermined number of re-quantized first or second data. Alternately, the feature is a distribution of values of predetermined number of first or second data subjected to adaptive quantization, and the adaptive quantization is ADRC (Adaptive Dynamic Range Coding).

Below, embodiments of a motion detection device as a principal part of an image signal processing apparatus based on a signal processing apparatus having the above configuration will be explained.

First Embodiment

Figure 7:
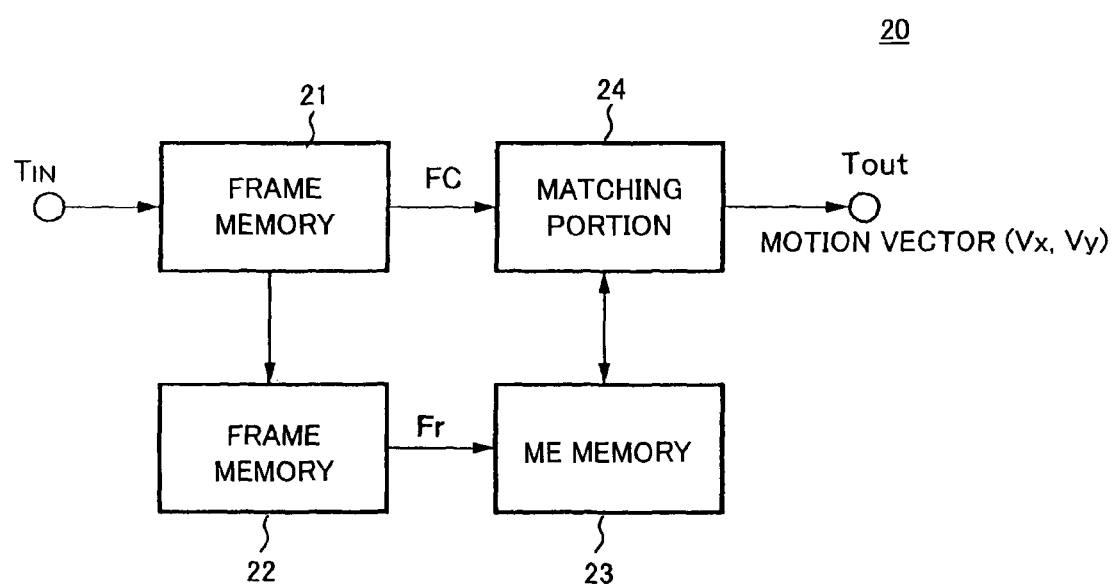
FIG. 7 is a block diagram showing a first embodiment of a motion detection device according to the present invention.

FIG. 7 is a block diagram showing a first embodiment of a motion detection device as a principal part of an image processing apparatus according to the present invention.

The motion detection device is provided with an ME memory for storing position information by using a feature as an address and performs matching processing by using a surrounding pixel value as a feature, so that motion vectors can be accurately estimated with a little amount of calculation.

Below, the specific configuration and function of the motion detection device will be explained in detail with reference to the drawings.

The motion detection device 20 comprises a second frame memory 21 as a first data storing portion and a second frame memory 22 as a second data storing portion, an ME memory 23 and a matching portion 24 as a matching portion.

Note that the first frame memory 21 configures the first feature extraction means according to the present invention, the second frame memory 22 configures the second feature extraction means according to the present invention, the ME memory 23 configures the storing means according to the present invention, and the matching portion 24 configures the motion vector calculation means (matching means) according to the present invention.

The first frame memory 21 stores an information of one frame of an image signal input from an input terminal TIN.

When the next frame information is input, the first frame memory 21 stores previously stored frame information, that is, the information of the current frame Fc and outputs the information of the current frame Fc to the second frame memory 22 and the matching portion 24.

Also, the first frame memory 21 supplies a feature of the focused pixel, that is, address information together with information of the current frame Fc to the matching portion 24.

The second frame memory 22 stores previous (for example, one time before) frame information stored in the first frame memory 21 as information of a reference frame Fr.

The ME memory 23 stores information including position coordinates of the focused pixel corresponding to a feature by using the feature as an address as a pixel value of a certain block range having the focused pixel at its center based on the information of the reference frame Fr stored in the second frame memory 22.

The matching portion 24 reads storage information in the ME memory 23 by using the feature of the focused pixel included in the information of the current frame Fc supplied from the first frame memory 21 as a feature address. Differential coordinates based on the focused pixel in the current frame and the stored information read from the ME memory 23 are output as a motion vector (Vx, Vy) of the focused pixel from a terminal TOUT. Note that when there are a plurality of stored information (position coordinates) in a feature address corresponding to the feature of the focused pixel, a motion vector by which a position and distance of the focused pixel become the minimum among the plurality of candidates is output.

Figure 8:
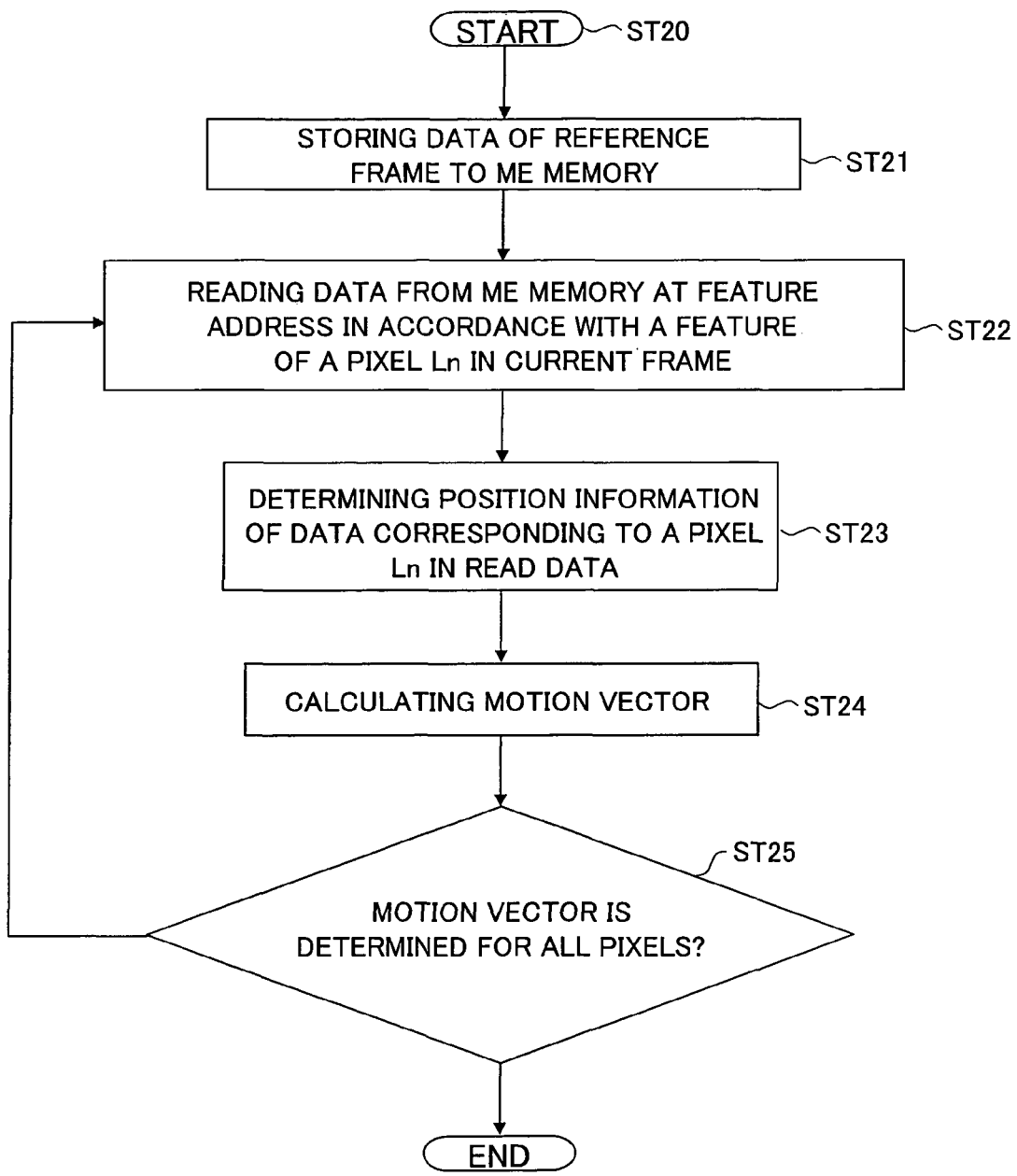
FIG. 8 is a flowchart showing an outline of motion vector detection according to the present embodiment.

FIG. 8 is a flowchart showing an outline of motion vector detection according to the present embodiment.

In this example, first, data of the reference frame Fr is stored in the ME memory 23 (step ST21). Next, the matching portion 24 reads data from the ME memory 13 at a feature address in accordance with a feature of a pixel Ln in the current frame Fc (Step ST22).

The matching portion 24 determines the position information of data corresponding to the pixel Ln in the read data (step ST 23). Then, motion vectors are calculated until motion vectors of all pixels are obtained (steps ST23 and ST24).

Below, the configuration and function of the ME memory 23 wherein a feature address system as a characteristic of the present embodiment will be explained further in detail with reference to FIG. 9 and FIG. 10.

Figure 9:
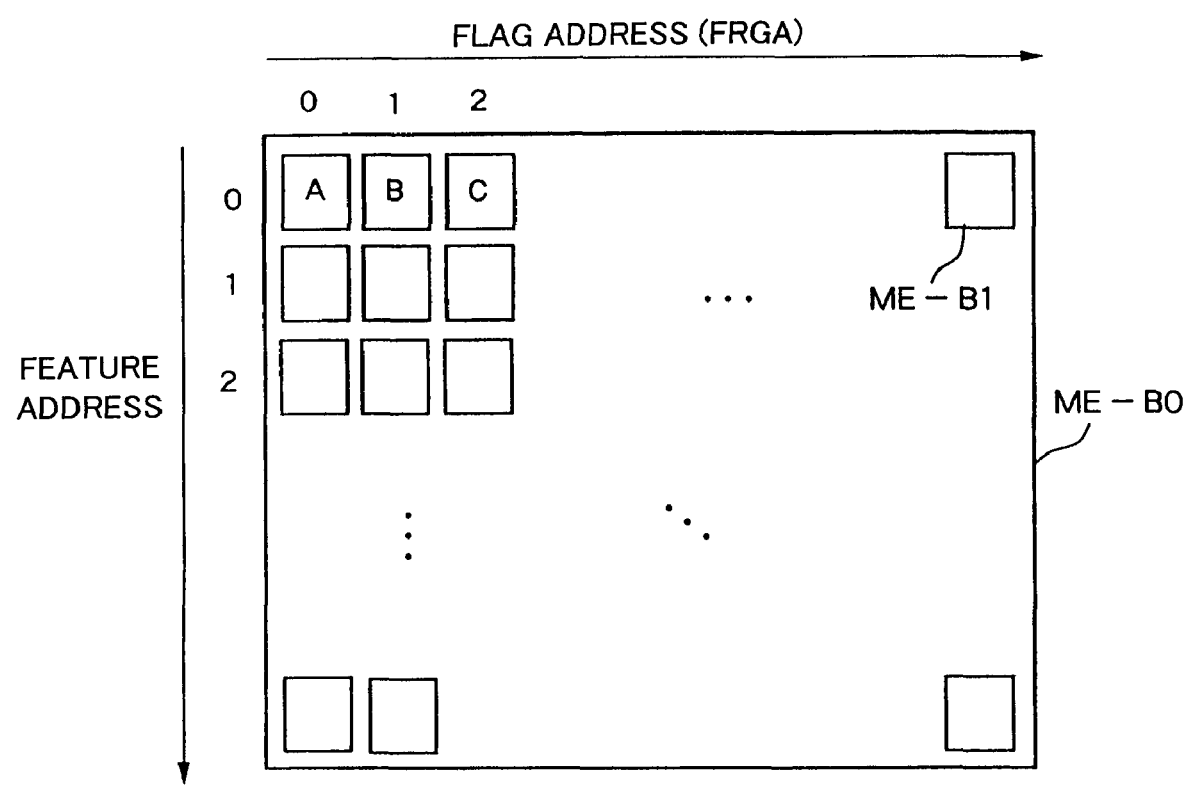
FIG. 9 is a view for explaining the configuration of a motion memory in a feature address system according to the present embodiment.
Figure 10:
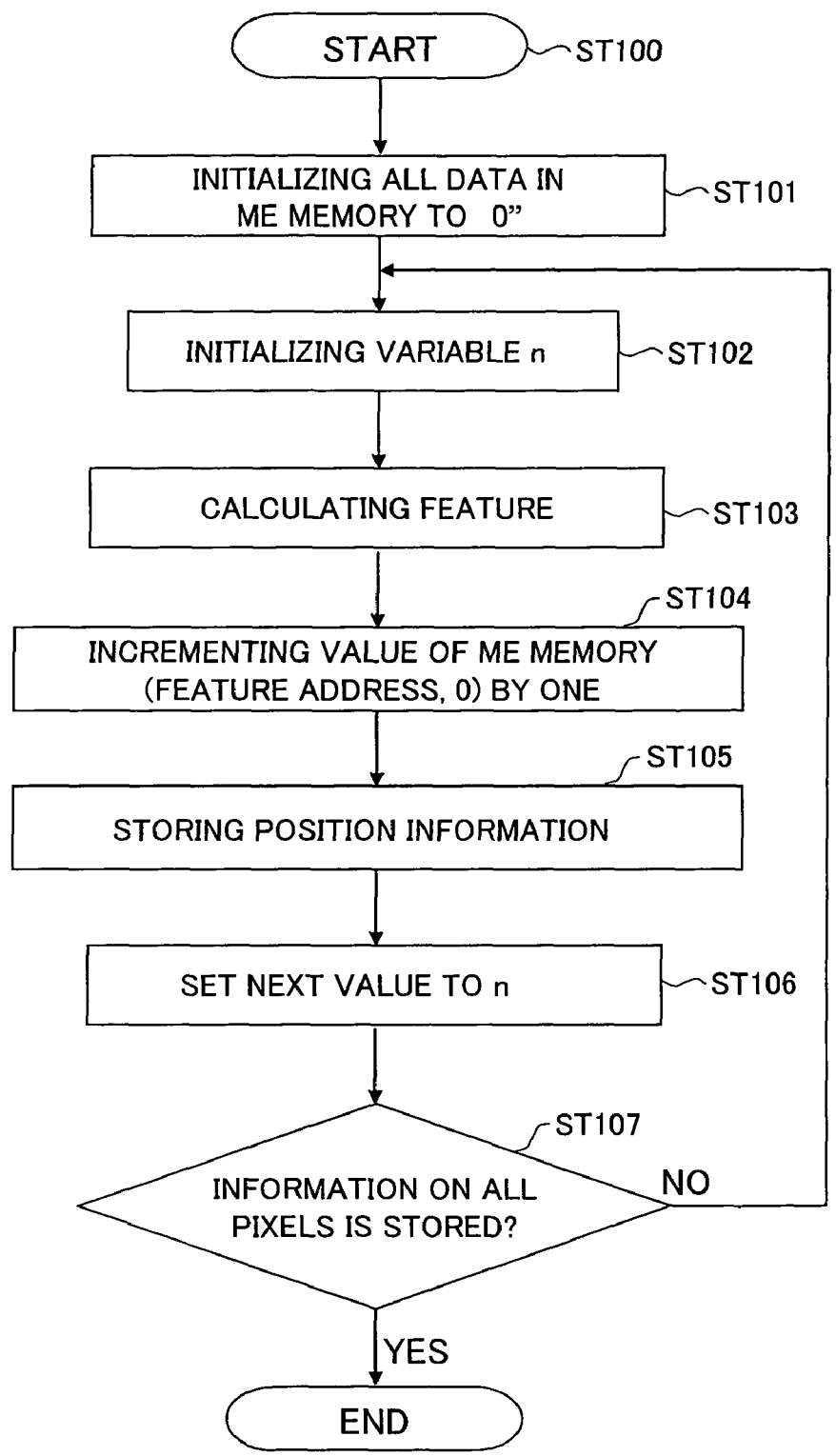
FIG. 10 is a view for explaining a procedure of storing in the motion memory in a feature address system according to the present embodiment.

FIG. 9 is a view showing an example of a configuration of the ME memory wherein the feature address system is applied. Also, FIG. 10 is a flowchart for explaining a procedure of storing information of the reference frame in the ME memory.

The conventional memory is for storing pixel value by using the position information of a pixel as an address, while the ME memory 23 stores for every feature position information of a pixel having the feature in flag addresses FRGA1, 2, . . . , that is, B, C . . . in FIG. 9 successively.

In the present embodiment, one cell ME-B1 has a storage capacity of an amount of position information. Also, the number of position information stored for the feature is stored in a flag address FRGA0.

The feature is a pixel value in a certain block having a focused pixel at its center. For example, when assuming that a block range is 3×3, the vertical direction is "i", the horizontal direction is "j", and a pixel value of a position (i, j) is L(i, j), a feature in this case becomes as in the next formula (2).

$$\{L(i-1,j-1), L(i-1,j), L(i-1,j+1), L(i,j-1), L(i,j),\\ L(i,j+1), L(i+1,j-1), L(i+1,j), L(i+1,j+1)\} \quad (2)$$

Next, a procedure of storing information of the reference frame to the ME memory will be explained with reference to the flowchart in FIG. 10.

When information of the reference frame Fr is stored in the frame memory 22, the processing starts.

Step ST101:

In the step ST101, all data in the ME memory is initialized to be "0" by writing "0" or turning on a reset signal.

Step ST102:

In the step ST102, a counter variable "n" for counting pixels in one frame memory is initialized to be "0".

Step ST103:

In the step ST103, a pixel value of a certain block range having the focused pixel Ln at its center is regarded as a feature (a feature address) in the frame memory 21 in FIG. 4.

Step ST104:

In the step ST104, a content in the ME memory (a feature, 0) is incremented by one.

Step ST105:

A feature address is set to be the feature in the step ST103 and the ME memory (a feature, 0) as a content of the ME memory 23 when a flag address is "0" is set to a read flag address. In the step ST105, the position information of the focused pixel Ln is written to a content of the ME memory (a feature, flag address) as a content of the ME memory 13.

Step ST106:

In the step ST106, the counter variable "n" is incremented.

Step ST107:

In the step ST107, whether the focused pixel Ln is the final pixel in the frame or not is judged. When it is not the final pixel, the procedure proceeds to the step ST103 and the same processing is repeated on the next pixel.

While, when it is the final pixel, the procedure proceeds to a step ST109 to finish the processing.

Next, a processing procedure of motion vector detection according to the present embodiment will be explained with reference to FIG. 7 and FIG. 11.

Figure 11:
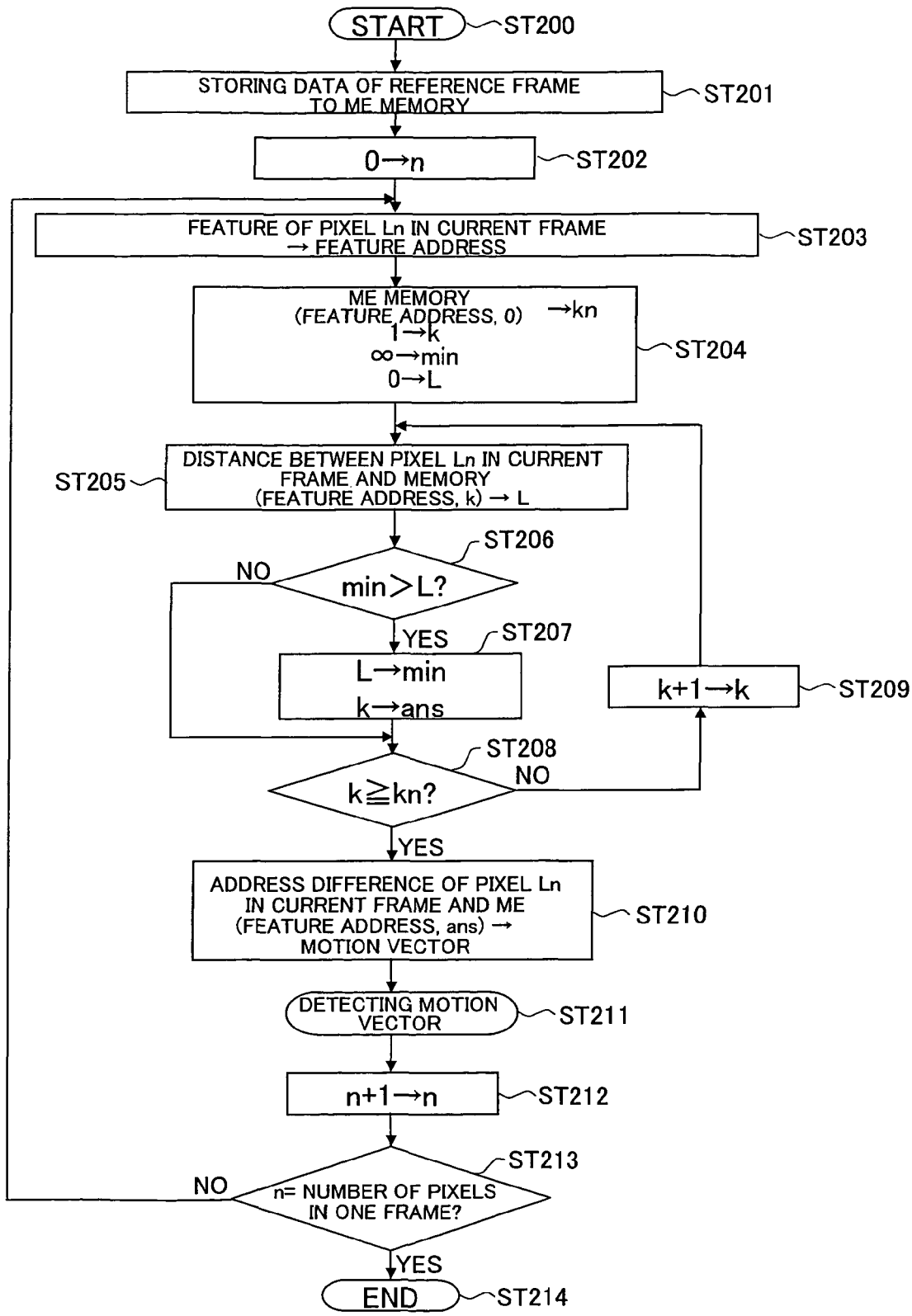
FIG. 11 is a flowchart for explaining an operation of motion detection in a feature address system according to the present embodiment.

Note that FIG. 11 is a flowchart for explaining the processing procedure of motion vector detection according to the present embodiment.

Step ST201:

In the step ST201, after storing information of the current frame Fc and the reference frame Fr respectively in the frame memories 21 and 22, information of the reference frame is stored in the ME memory 23 while converting it to a feature address. The details are explained above (the steps ST100 to ST109).

Step ST202:

In the step ST202, the counter variable "n" for counting pixels in one frame is initialized to be "0".

Step ST203:

In the step ST203, a feature of the focused pixel Ln in the first current frame 21 is a pixel value of a certain block range having the focused pixel at its center, so it is sent as a feature to the matching portion 24.

Step ST204:

In the step ST204, the matching portion 24 reads a value of a content ME memory (a feature address, 0) from the ME memory 23 by using the received feature as a feature address and substitutes for a variable "kn" meaning the number of options.

Also, a variable "k" meaning a counter of the number of options is initialized to be "1", a variable "min" meaning the minimum value of a distance is initialized to be ∞ or a sufficiently large value, and a variable "L" meaning a distance is initialized to be "0".

Step ST205:

In the step ST205, a distance between the focused pixel Ln in the current frame and an ME memory content (a feature address, k)=position coordinates read from the ME memory 23 is calculated and substituted for the variable "L".

Step ST206:

In the step ST206, the distinction of large and small between the distance L obtained in the step ST205 and the minimum value "min" of the distance are performed.

As a result, when min>L, the procedure proceeds to a step ST207 for updating the minimum value L of the distance, while when min≦L, the update step is skipped and the procedure proceeds to a step ST208.

Step ST207:

In the step ST207, the minimum value "min" of the distance is updated to be L. At this time, a flag address value, that is, "k" is stored to a variable "ans".

Step ST208:

In the step ST208, whether the candidate counter indicates the number of candidates or not is judged, and when it is the number of candidates, the procedure proceeds to a step ST210, while when there are still other candidates, the procedure proceeds to the step ST209.

Step ST209:

In the step ST209, the candidate counter "k" is incremented, then, the procedure proceeds to the step ST 205.

Step ST210:

In the step ST210, the position information having the minimum distance to the pixel Ln in the current frame, that is, a value of a content ME memory (a feature address, ans) of the ME memory 23 is read and the differential coordinates are regarded as a motion vector.

Step ST211:

In the step ST211, a motion vector of the focused pixel is output.

Step ST212:

In the step ST212, a counter variable "n" of pixels is incremented.

Step ST213:

In the step ST213, whether the focused pixel is the final pixel in the current frame or not is judged. As a result of the judgment, when it is the final pixel the procedure proceeds to a step ST214, while not, the procedure proceeds to the step ST203 to obtain a motion vector of the next pixel.

As to a pixel value, for example, when one pixel=8 bits, matching processing can be performed with full bit (8 bits) information on an image such as computer graphics (CG), while, since frames are uneven in a natural image, the matching processing is preferably performed by omitting predetermined bits from a plurality of bits. Specifically, several low bits may be masked for use or the number of bits may be decreased for re-quantization.

Namely, it is preferable to decrease the number of bits in nonlinear/linear quantization (decrease the number of quantization bits).

As explained above, according to the present first embodiment, a first frame memory 21 for storing information of a current frame Fc and outputting address information as a feature of a focused pixel together with the information of the current frame Fc; a second frame memory 12 for storing previous (one time before) frame information stored in the first frame memory 21 as information of a reference frame Fr; an ME memory 23 for converting a feature including a pixel value of a certain block range having the focused pixel at its center based on the information of the reference frame Fr stored in the second frame memory 22 and storing information including position information after the conversion; and a matching portion 24 for reading storage information in the ME memory 23 by using a feature of the focused pixel included in the information of the current frame Fc supplied from the first frame memory 21 as a feature address, calculating a distance between the focused pixel in the current frame and the feature address (position coordinates) read from the ME memory 23, and detecting the differential coordinates based on the position information having the minimum distance in a plurality of candidates as a motion vector (Vx, Vy) of the focused pixel, as a result, effects below can be obtained.

Namely, in the first embodiment, spatial pattern information in a block area is used as a feature and calculation and comparison of a distance are performed only for exactly the number of candidates, so that there is an advantage that highly accurate motion vector detection becomes possible with a smaller amount of calculation than that in the conventional method.

Note that when there are a large number of candidates, storage information in the ME memory 23 does not have to be the whole information of one frame and may be divided to some areas.

Second Embodiment

FIG. 12 is a block diagram showing a second embodiment of a motion detection device as an image processing apparatus according to the present invention.

A different point in the present second embodiment from the first embodiment explained above is that matching with a preferable feature becomes possible by providing class generation portions 25-1 and 25-2 as feature generation means for obtaining a feature. Note that, as shown in FIG. 13, the configuration of providing one class generation portion 25 as in FIG. 13 is also possible. As a function of the circuit, it also has functions of the class generation portion 25-1 and 25-2.

The class generation portion 25-1 receives information of a current frame Fc of the first frame memory 21, generates a quantization code based on the ADRC as a feature of the current frame and outputs to a matching portion 24A.

Also, the class generation portion 25-2 receives information of a reference frame Fr of the second frame memory 22, generates a quantization code based on the ADRC as a feature of the current frame and outputs to the ME memory 23.

The matching portion 24A reads storage information of the ME memory 23 by using a feature of the current frame as a feature address and performs matching of a focused pixel in a current frame and quantization codes of the ADRC included in the feature address read from the ME memory 23 to detect a motion vector of the focused pixel.

As explained above, the ADRC is used for generating a feature in the class generation portions 25-1 and 25-2 according to the second embodiment. The ADRC (Adaptive Dynamic Range Coding) is an adaptive quantization method developed for high performance coding of a VTR (Video Tape Recorder) and is capable of effectively expressing a partial pattern of a signal level with a short word length, so that the ADRC is used for code generation of spatial class division in the second embodiment.

The ADRC is an algorithm for performing re-quantization by evenly dividing between the maximum value MAX and the minimum value MIN by a specified bit length by the formula 3 below, wherein a dynamic range of a spatial class tap is DR, a bit assignment is n, a data level of a pixel of a spatial class tap is L and a re-quantization code is Q.

$$DR = MAX - MIN + 1$$

$$Q = \{(L - MIN + 0.5) \times 2^n \div DR\} \quad (3)$$

Note that { } indicates rounding processing. A matching processing flow will be omitted because it is equivalent to that using the feature as a quantization code of the ADRC in the above explanation of FIG. 11.

Figure 14B:
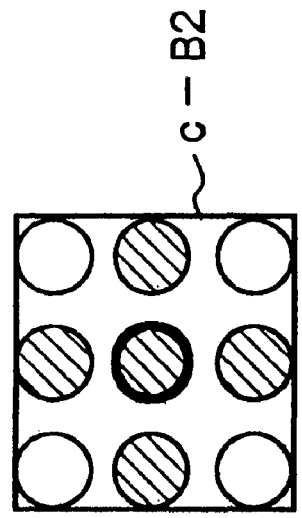
FIG. 14A to FIG. 14D are views showing an example of taking a class tap.
Figure 14D:
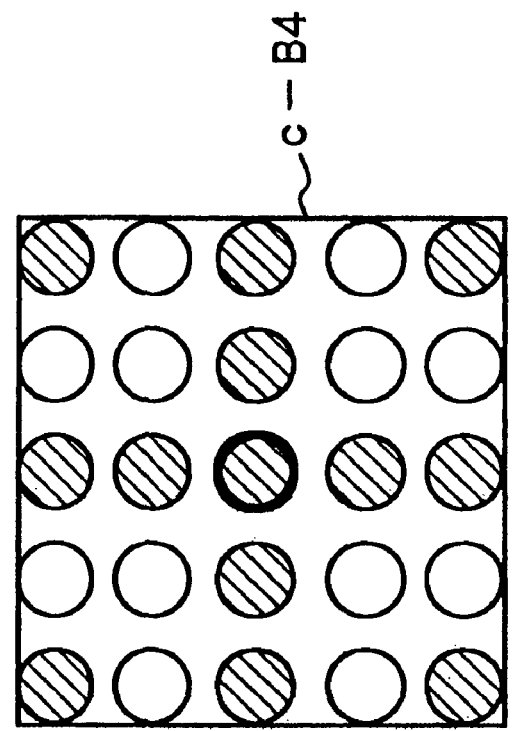
Figure 14A:
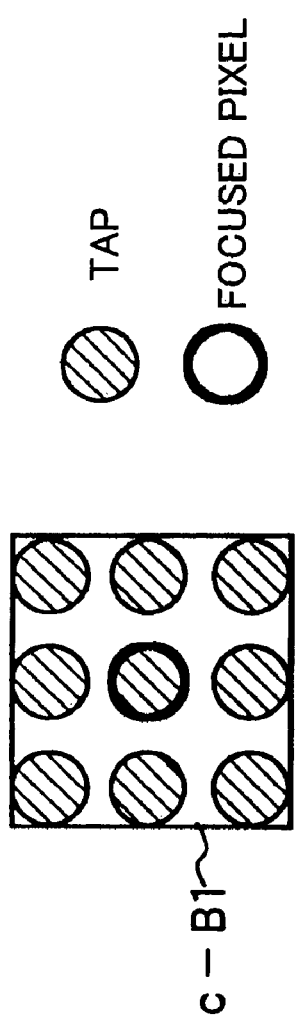

As an example of taking a spatial class tap, when a block size is 3×3, all pixels may be used as shown in FIG. 14A or it may be configured to be the shape of a cross, and it may be determined within a limit of an information amount given to the class code.

Figure 14C:
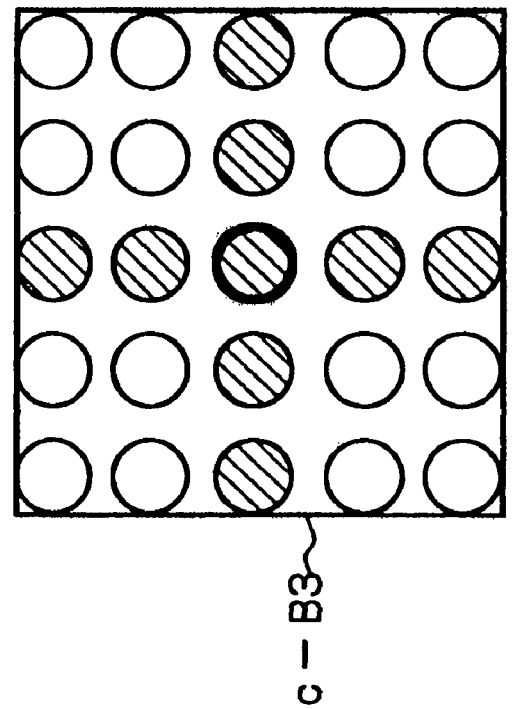

Similarly, as an example of the case where the block size is 5×5, embodiments shown in FIG. 14C and FIG. 14D can be applied.

The example in FIG. 14C is the case of configuring to be the shape of a cross, and the example in FIG. 14D is the case of configuring to be the shape of a cross and, furthermore, using pixels at corners.

Next, the fact that the case of using a surrounding pixel value is superior to the case of using the ADRC quantization code will be explained with reference to FIG. 15A and FIG. 15B.

Figure 15A:
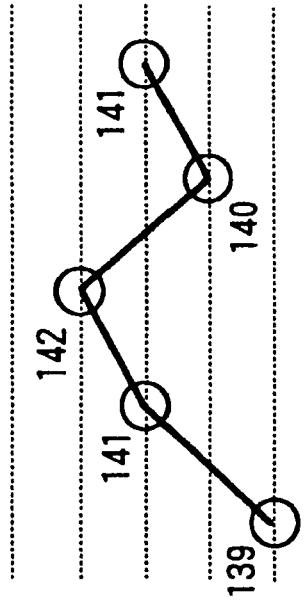
FIG. 15A and FIG. 15B are views for explaining the fact that using an ADRC quantization code is superior to using a surrounding pixel value.
Figure 15B:
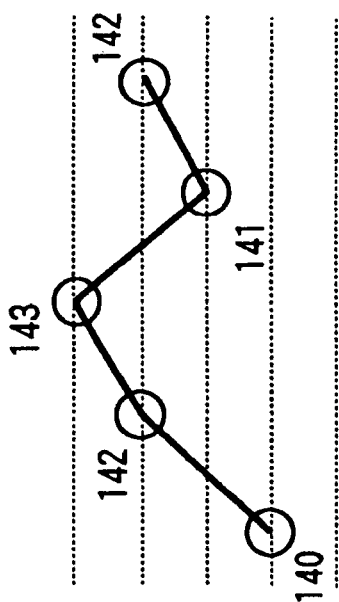

FIG. 15A and FIG. 15B show a pixel value when certain one line of an image is moved from a reference frame to a current frame for facilitating understanding. Also, FIG. 16 shows a correspondence relationship of decimal number expression and hexadecimal number expression of luminance values.

Normally, in the case of a natural image, even when the same pattern is moved, there is a low possibility to be the same pixel value and a pixel level deviates as shown in FIG. 15A and FIG. 15B.

In this case, the point is whether or not it is possible to correctly detect as the same pattern. A coding result in the case of masking lower bits to suppress an effect of noise components when using a surrounding pixel value as a feature is listed.

As described above, there are some cases of erroneous detection even being the same pattern.

On the other hand, quantization coding by the ADRC is resistible to small level fluctuations due to capability of effectively expressing a partial pattern of a signal level with a short word length, and the same coding result can be obtained.

Specifically, an ADRC code of a certain line of the reference frame is "01101", and an ADRC code of a certain line of the current frame is also "01101", so that the two match.

As explained above, according to the second embodiment, by using the ADRC quantization code as a feature, there is an advantage that motion vector detection at higher accuracy than conventional case becomes possible.

In the first and second embodiments, a memory device corresponding to motion vector detection was explained. Therefore, a memory device for storing spatial coordinates by using each feather quantity as an address was taken as an example.

However, the present invention can be applied to systems performing matching other than motion vector detection.

This idea can be expressed "a memory device for storing information on first data, characterized by comprising an input means for receiving as an input a first feature indicating a first feature (address) of focused data in second data being different from the above first data; and a memory means for storing a second feature indicating a second feature (coordinates) of the above certain data in the above first data at a position corresponding to a third feature indicating the above first feature (address) of certain data in the above first data;

wherein the above second feature as the above second feature of the above first data is output from a position corresponding to the above first feature of the above memory means".

Namely, a second feature indicating a feature B (second feature) of data may be stored by using each first feature indicating a feature A (first feature) of data as an address. The feature A and feature B can be suitably set/changed in accordance with an object of a system/device performing matching. For example, in the present embodiment, an explanation was made assuming that the feature A: a pixel value pattern/the ADRC code, and the feature B: coordinates, but other features may be also used.

INDUSTRIAL APPLICABILITY

According to a memory device, a signal processing apparatus, an image signal processing apparatus and a signal processing methods of the present invention, highly accurate motion vector detection becomes possible, so that they are applicable to processing requiring matching, such as a motion detection device and an object search device used in a moving image compression apparatus, etc.

EXPLANATION OF REFERENCES

10 . . . SIGNAL PROCESSING DEVICE
11 . . . FIRST DATA STORAGE PORTION
12 . . . SECOND DATA STORAGE PORTION
13 . . . MOTION DETECTION MEMORY (ME MEMORY)
14 . . . MATCHING PORTION
20, 20A . . . MOTION DETECTION DEVICE
21 . . . FIRST FRAME MEMORY
22 . . . SECOND FRAME MEMORY

23 ... MOTION DETECTION MEMORY (ME MEMORY)
24, 24A ... MATCHING PORTION
25 ... CLASS GENERATION PORTION

What is claimed is:

1. A memory device for storing position information of data in a predetermined image signal, comprising:
   an input/output means for receiving or outputting said position information; and
   a storage portion configured to store said position information at a feature address corresponding to, not position information of said data, but a feature based on said data, the feature being a distribution of values of a predetermined number of said data having been requantized.

2. A memory device as set forth in claim 1, wherein said memory device is a semiconductor device.

3. A signal processing apparatus for performing matching processing by using a first image signal including a plurality of first data and a second image signal including a plurality of second data, comprising:
   a first feature extraction means for extracting a first feature, based on values of said first data, the first feature including focused data, the focused data being data at a focused position in said first image signal; and
   a storage means for storing, for said second data, position information of said second data at feature addresses corresponding to, not position information of said second data, but features based on said second data, each feature corresponding to said second data being based on pixels of said second data, wherein:
   the position information of said second data corresponding to said focused data is obtained by reading the position information stored in said storage means at a feature address corresponding to the first feature; and
   when a plurality of position information of said second data corresponding to the first feature of said focused data are read from said storage means, said position information having the shortest distance to the focused position of said focused data is regarded as position information of said second data corresponding to said focused data.

4. A signal processing apparatus as set forth in claim 3, wherein said storage means stores the position information of said second data in advance.

5. A signal processing apparatus as set forth in claim 3, wherein said signal processing apparatus further comprises a second feature extraction means for extracting the features of each of the second data in said second signal.

6. A signal processing apparatus as set forth in claim 3, wherein said first feature extraction means further comprises a second feature extraction means for extracting the features of each of the second data in said second signal.

7. A signal processing apparatus as set forth in claim 3, wherein said features are extracted by using a predetermined number of the first or second data.

8. A signal processing apparatus as set forth in claim 7, wherein said features are a distribution of values of a predetermined number of the first or second data.

9. A signal processing apparatus as set forth in claim 8, wherein:
   said first or second data is expressed by a plurality of bits; and
   said features are a distribution of values of said predetermined number of the first or second data, wherein predetermined bits are omitted from said plurality of bits.

10. A signal processing apparatus as set forth in claim 9, wherein said predetermined bits are lower side bits of said first or second data.

11. A signal processing apparatus as set forth in claim 7, wherein said features are a distribution of values of the predetermined number of re-quantized first or second data.

12. A signal processing apparatus as set forth in claim 7, wherein said features are a distribution of values of the predetermined number of the first or second data subjected to adaptive quantization.

13. A signal processing apparatus as set forth in claim 12, wherein said adaptive quantization is an ADRC.

14. An image signal processing apparatus for detecting motion vectors by using a first image signal including a plurality of first data and a second image signal including a plurality of second data, comprising:
   a first feature extraction means for extracting a first feature, based on values of said first data, the first feature including focused data, the focused data being data at a focused position in said first image signal;
   a storage means for storing, for said second data, position information of said second data at feature addresses corresponding to, not position information of said second data, but features based on said second data, each feature corresponding to said second data being based on pixels of said second data; and
   a motion vector calculation means for obtaining the position information of said second data corresponding to said focused data by reading the position information of said second data stored in said storage means at a feature address corresponding to said first feature, and calculating a motion vector of said focused data by using position information of said focused data and the obtained position information of said second data, wherein
   when a plurality of position information of said second data corresponding to the first feature of said focused data are read from said storage means, said motion vector calculation means regards said position information having the shortest distance to the focused position of said focused data as position information of said second data corresponding to said focused data.

15. An image signal processing apparatus as set forth in claim 14, wherein
   said image signal processing apparatus further comprises a second feature extraction means for extracting the features of each of the second data in said second image signal.

16. An image signal processing apparatus as set forth in claim 14, wherein
   said first feature extraction means further comprises a second feature extraction means for extracting the features of each of the second data in said second image signal.

17. A signal processing method implemented by a computer programmed as a signal processing device for performing matching processing by using a first image signal including a plurality of first data and a second image signal including a plurality of second data, comprising:
   a first step for extracting, by the computer, a first feature, based on values of said first data, the first feature including focused data, the focused data being data at a focused position in said first image signal;
   a second step for storing, in a memory, for said second data, position information of said second data at feature addresses corresponding to, not position information of said second data, but features based on said second data, each feature corresponding to said second data being based on pixels of said second data; and
   a third step for obtaining the position information of said second data corresponding to said focused data by reading the position information stored in said second step at a feature address corresponding to the first feature, wherein, when a plurality of position information of said second data corresponding to the first feature of said focused data are read from the memory, said position information having the shortest distance to the focused position of said focused data is regarded as position information of said second data corresponding to said focused data.

18. A signal processing method as set forth in claim 17, further including a fourth step for extracting the features of each of the second data in said second signal.

19. A signal processing method as set forth in claim 17, wherein said first step further includes a fourth step for extracting the features of each of the second data in said second signal.

20. A signal processing method as set forth in claim 17, wherein said features are extracted by using a predetermined number of the first or second data.

21. A signal processing method as set forth in claim 20, wherein said features are a distribution of values of a predetermined number of the first or second data.

22. A signal processing method as set forth in claim 21, wherein:

said first or second data is expressed by a plurality of bits; and said features are a distribution of values of said predetermined number of the first or second data, wherein predetermined bits are omitted from said plurality of bits.

23. A signal processing method as set forth in claim 22, wherein said predetermined bits are lower side bits of said first or second data.

24. A signal processing method as set forth in claim 20, wherein said features are a distribution of values of predetermined number of re-quantized first or second data.

25. A signal processing method as set forth in claim 20, wherein said features are a distribution of values of a predetermined number of the first or second data subjected to adaptive quantization.

26. A signal processing method as set forth in claim 25, wherein said adaptive quantization is an ADRC.

27. An image signal processing method implementing by a computer programmed as an image signal processing device for detecting a motion vector by using a first image signal including a plurality of first data and a second image signal including a plurality of second data, comprising:

a first step for extracting, by the computer, a first feature, based on values of said first data, the first feature including focused data, the focused data being data of a focused position in said first image signal;

a second step for storing, in a storage means, for said second data, position information of said second data at feature addresses corresponding to, not position information of said second data, but features based on said second data, each feature corresponding to said second data being based on pixels of said second data;

a third step for obtaining position information of said second data corresponding to said focused data by reading position information stored in said storage means at a feature address corresponding to the first feature; and a fourth step for calculating a motion vector of said focused data by using position information of said focused data and the obtained position information of said second data, wherein, when a plurality of position information of said second data corresponding to the first feature of said focused data is read from said storage means, said third step regards said position information having the shortest distance to the focused position of said focused data as position information of said second data corresponding to said focused data.

28. An image signal processing method as set forth in claim 27, wherein said image signal processing method further includes a fifth step for extracting the features of each of the second data in said second image signal.

29. An image signal processing method as set forth in claim 27, wherein said first step further includes a fifth step for extracting the features of each of the second data in said second image signal.

* * * * *